United States Patent [19]

Tajima

[11] Patent Number: 4,933,929
[45] Date of Patent: Jun. 12, 1990

[54] WAVELENGTH MULTIPLEXED OPTICAL TRANSMITTER FOR GENERATING CONSTANT-AMPLITUDE ANGLE-MODULATED BEAMS TO ELIMINATE PHASE NOISE IN ADJACENT TRANSMISSION CHANNELS

[75] Inventor: Kazuhito Tajima, Tokyo, Japan
[73] Assignee: NEC Corporation, Tokyo, Japan
[21] Appl. No.: 212,385
[22] Filed: Jun. 27, 1988

[30] Foreign Application Priority Data

Jun. 29, 1987 [JP] Japan .................... 62-159674
Jun. 30, 1987 [JP] Japan .................... 62-161179

[51] Int. Cl.$^5$ ............................................. H04B 9/00
[52] U.S. Cl. .................................... 370/3; 455/618
[58] Field of Search ............. 455/606, 607, 608, 609, 455/610, 611, 612, 613, 617, 618; 370/1, 3

[56] References Cited

U.S. PATENT DOCUMENTS

| 4,561,117 | 12/1985 | Epworth ...................... 455/609 |
| 4,611,352 | 9/1986 | Fujito ......................... 455/609 |
| 4,635,246 | 1/1987 | Taylor et al. ................. 370/3 |
| 4,763,326 | 9/1988 | Krick .......................... 370/3 |

FOREIGN PATENT DOCUMENTS

| 0022456 | 2/1984 | Japan .......................... 455/609 |
| 0079647 | 5/1984 | Japan .......................... 455/613 |
| 0128638 | 6/1986 | Japan .......................... 455/613 |
| 8607657 | 12/1986 | PCT Int'l Appl. ............. 455/609 |

OTHER PUBLICATIONS

Electronics Letter, vol. 20, No. 24, pp. 996–997, Nov. 22, 1984.
IEEE Journal of Quantum Electronics QE-vol. 19, No. 1, pp. 47–58–Jan. 1983.
Journal of Optical Society of America, vol. 2, No. 8, pp. 1320–1326–Aug. 1985.

Primary Examiner—Benedict V. Safourek
Assistant Examiner—L. Van Beek
Attorney, Agent, or Firm—Sughrue, Mion, Zinn, Macpeak & Seas

[57] ABSTRACT

In a wavelength multiplexed optical transmission system, digital signals of separate channels are respectively converted into optical signals of different wavelengths which are assigned to plural optical channels and multiplexed into a beam optical signal for coupling to an optical transmitted medium. Each of the optical channels includes a semiconductor laser for emitting a laser beam and an optical phase or frequency modulator for modulating the laser beam with one of the digital input signals. A light intensity limiter, or a laser diode saturable light amplifier is located in the path of the light from the modulator to maintain the modulated laser beam at a constant amplitude to prevent interchannel crosstalk which would otherwise occur in the transmission medium as a result of variations in the output of the laser and/or modulator.

1 Claim, 4 Drawing Sheets

WAVELENGTH MULTIPLEXED OPTICAL TRANSMITTER FOR GENERATING CONSTANT-AMPLITUDE ANGLE-MODULATED BEAMS TO ELIMINATE PHASE NOISE IN ADJACENT TRANSMISSION CHANNELS

BACKGROUND OF THE INVENTION

The present invention relates generally to angular modulation optical transmission systems, and more specifically to a wavelength multiplexed optical transmitter.

Coherent light communications systems, in particular, the phase shift keying systems, are well suited for long distance communications purposes. Because of the coherent nature of the propagating waves, many different wavelengths can be multiplxed and transmitted on a single transmission medium over long distances.

To implement a high capacity, long distance optical transmission system, it is necessary to increase the output of laser as well as to increase the number of channels to be multiplexed. However, interchannel crosstalk occurs as a result of an incrdase in the number of such channels and in the intensity of light due to the nonlinear optical characteristic of the optical fiber.

More specifically, an intensity variation in the laser output of a given channel gives rise to phase variations, or noise in other channels due to the nonlinear characteristic of the transmission medium, causing a significant impairment of PSK signals. As described in Electronics Letter, Vol. 20, No. 24, pages 996–997, 1984, the following relation exists between a light intensity change in a given channel and a phase change in another channel:

$$\Delta\phi_2 = \frac{2 \times 10^5 \pi \cdot \omega_1 \cdot n_2 \cdot Le}{3n \cdot c^2 \cdot Ae} \Delta P_1$$

where, $\Delta P_1$ represents the light intensity variation of the source channel, and $\Delta\phi_2$ is the phase change of the affected channel, $\omega_1$ represents the angular frequency of the signal, $n_2$ is the nonlinear refractive index of the optical fiber (which is equal to $1.1 \times 10^{-13}$ esu), Le represents the effective length of the optical fiber and is equal to $(1-e^{-\alpha L})/\alpha$, (where $\alpha$ is the light loss coefficient of the optical fiber, L is the actual length of the optical fiber), n is the refractive index of the optical fiber, c is the velocity of light in vacuum, and Ae represents the effective cross-sectional area of the optical fiber (which is approximately the actual cross section of the core). Since the phase change $\Delta\phi$ is proportional to the sum of the light intensity variations in other channels, the phase noise severely degrades the quality of a wavelength multiplexed-phase sensitive optical transmission system.

In order to avoid the crosstalk, one solution would be to prevent the variation of the output light intensity of the light source. However, even if use is made of a semiconductor laser which can generate an output having a small amount of light intensity variations and is driven by a constant current, the laser exhibits 1% output intensity variation (I.E.E.E. Journal of Quantum Electronics, QE-Vol. 19, pages 47–58, 1983, Yamamoto et al.). Further, an angular modulator, typically, ferroelectric material such as LiNbO₃, is also not satisfactory since the angular modulation of light causes the light intensity to fluctuate in a range from several to 10% (The Journal of Optical Society of America, Vol. 2, No. 8 pages 1320–1326, 1985).

SUMMARY OF THE INVENTION

It is therefore an object of the present invention to provide a wavelength multiplexed optical transmitter which enables the implementation of a high capacity, long distance optical communication system by reducing undesired light intensity variation. This object is obtained by maintaining the output light intensity of each transmission channel of a wavelength multiplexed transmission system at a constant level.

Specifically, the wavelength multiplexed optical transmitter of the present invention comprises a plurality of light sources for respectively generating light beams of different wavelengths, typically, with a separation of 0.02 μm. Optical modulators are associated respectively with the light sources. Each optical modulator performs angular modulation on the light beam of the associated light source with a digital signal. The angle-modulated light beam from each modulator contains amplitude-variation components which result from the angular modulation of the digital signal and from intensity variation of the light beam of the associated light source. Amplitude control devices are respectively arranged in the output paths of the associated optical modulators to extract constant amplitude, angle-modulated components from the outputs of the associated modulators by eliminating the amplitude-variation components. The extracted constant-amplitude components are multiplexed into a single beam for coupling to an optical transmission medium.

Preferably, the light intensity limiter comprises a negative feedback circuit formed by an optical intensity modulator which is located in the path of the phase (or frequency) modulated output light and controlled by a negative feedback signal representative of deviations of the light intensity of the modulated light from a reference intensity.

BRIEF DESCRIPTION OF THE DRAWINGS

The present invention will be further described in detail with reference to the accompanying drawings, in which.

DETAILED DESCRIPTION

Figure 1:
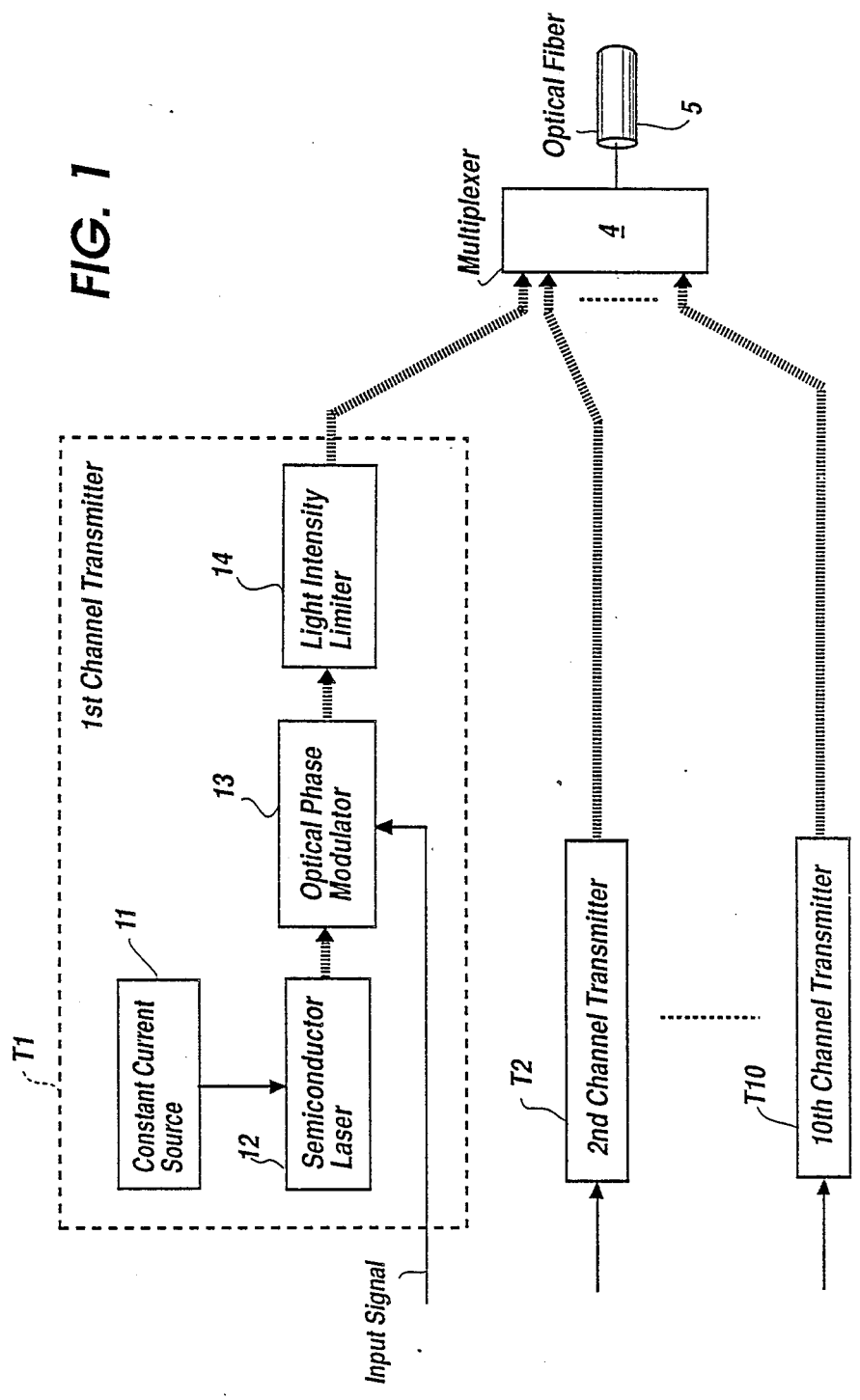
FIG. 1 is a block diagram of a wavelength multiplexed optical transmission system of the present invention.

Referring to FIG. 1, there is schematically shown a wavelength multiplexed PSK optical transmission system according to an embodiment of this invention. As a typical example, the system includes first to tenth channel transmitters T1 to T10 of identical configuration for transmitting optical signals of different wavelengths. There is a wavelength difference of 0.02 μm between adjacent channels. A wavelength of 1.540 μm is assigned to the first channel transmitter T1 in the illustrated embodiment. Digital signals S1 to S10 are respectively coupled to the transmitters T1 to T10 and their optical outputs are multiplexed in a combiner, or wavelength multiplexer 4 having a loss of 10% and fed to an optical fiber 5 which may extend over a distance of about 400 km and have a loss of 0.2 dB/km.

Each of the transmitters T1 to T10 comprises a single-mode semiconductor laser 12 with an output power of about 30 mW, the laser 12 being driven by a constant current source 11 so that the output variation of this laser can be maintained at a value below 1%. The semiconductor laser 12 operates in a continuous-wave mode and its output is coupled to an optical phase modulator 13 where the laser output is phase modulated with the associated digital input signal into a BPSK optical signal having a bit rate of 4 Gb/s, for example. The optical phase modulator 13 is constructed of a LiNbO$_3$ electrooptic modulator of a travelling wave type to ensure satisfactory high frequency operation. To obtain the required $\pi$-radian phase shift, the digital input signal has a voltage of 10 volts. Typical values of the loss and output power of the optical phase modulator 13 are 1.5 dB and 22 mW. The phase shift produced by the phase modulator 13 would normally introduce a light intensity variation of about 10%. To suppress this intensity variation, the output light from the phase modulator 13 is supplied to a light intensity limiter 14 where the fluctuation of the light intensity is eliminated.

Figure 2:
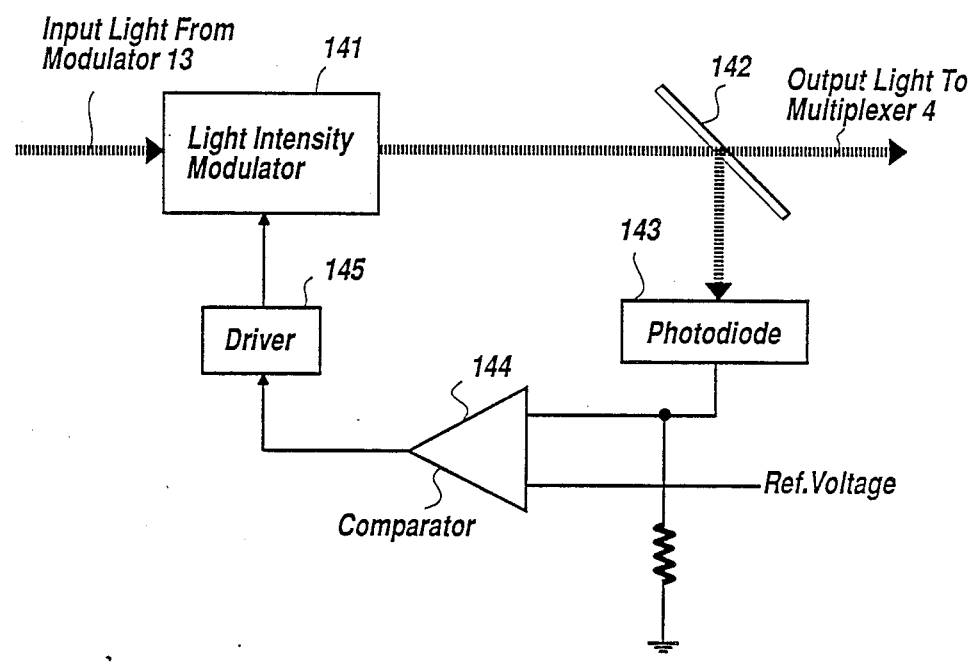
FIG. 2 is an illustration of details of the light intensity limiter of FIG. 1.

As shown in FIG. 2, the light intensity limiter 14 is composed of a light intensity modulator 141 to which the output light of phase modulator is coupled, a beam splitter 142 disposed in the path of an output light from the intensity modulator 141 and a PIN photodiode 143 located in the path of light reflected off the beam splitter 142. The light intensity modulator 141 may be constructed in a manner similar to the phase modulator 13. To provide intensity modulation, modulator 141 includes a pair of waveguides on one surface of a lithium niobate crystal and a control signal is applied thereto so that it affects the coupling coefficient between the waveguides. The output light of intensity modulator 141 is separated by the beam splitter 142 into two paths, one being directed to the multiplexer 4 and the other to the photodiode 143. The latter accounts for 1 to 2% of the light output to the multiplexer 4. The PIN photodiode converts the incident light into a corresponding voltage signal which is fed to a voltage comparator 144 for comparison with a reference voltage. The difference between the compared voltages is supplied through a driver 145 to the control terminal of the intensity modulator 141 as a negative feedback signal to control the output light intensity of the modulator 141 at a constant value.

Figure 3:
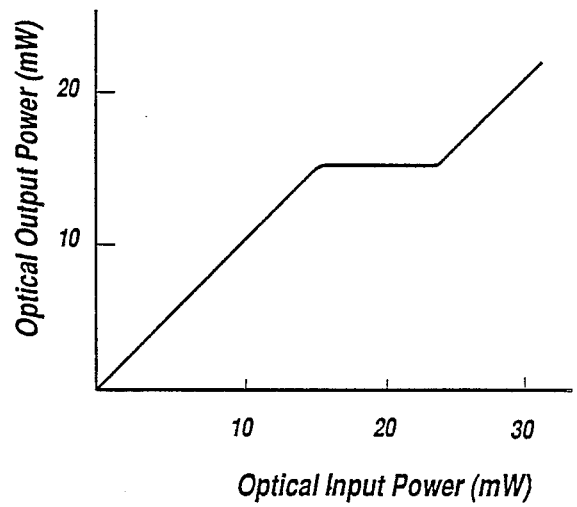
FIG. 3 is a graphic representation of the input versus output characteristic of the light intensity modulator of FIG. 2.

As indicated in FIG. 3, for an input optical power in the range between 16 and 24 mW, the optical output power of the light intensity modulator 141 can be maintained constant.

Figure 4:
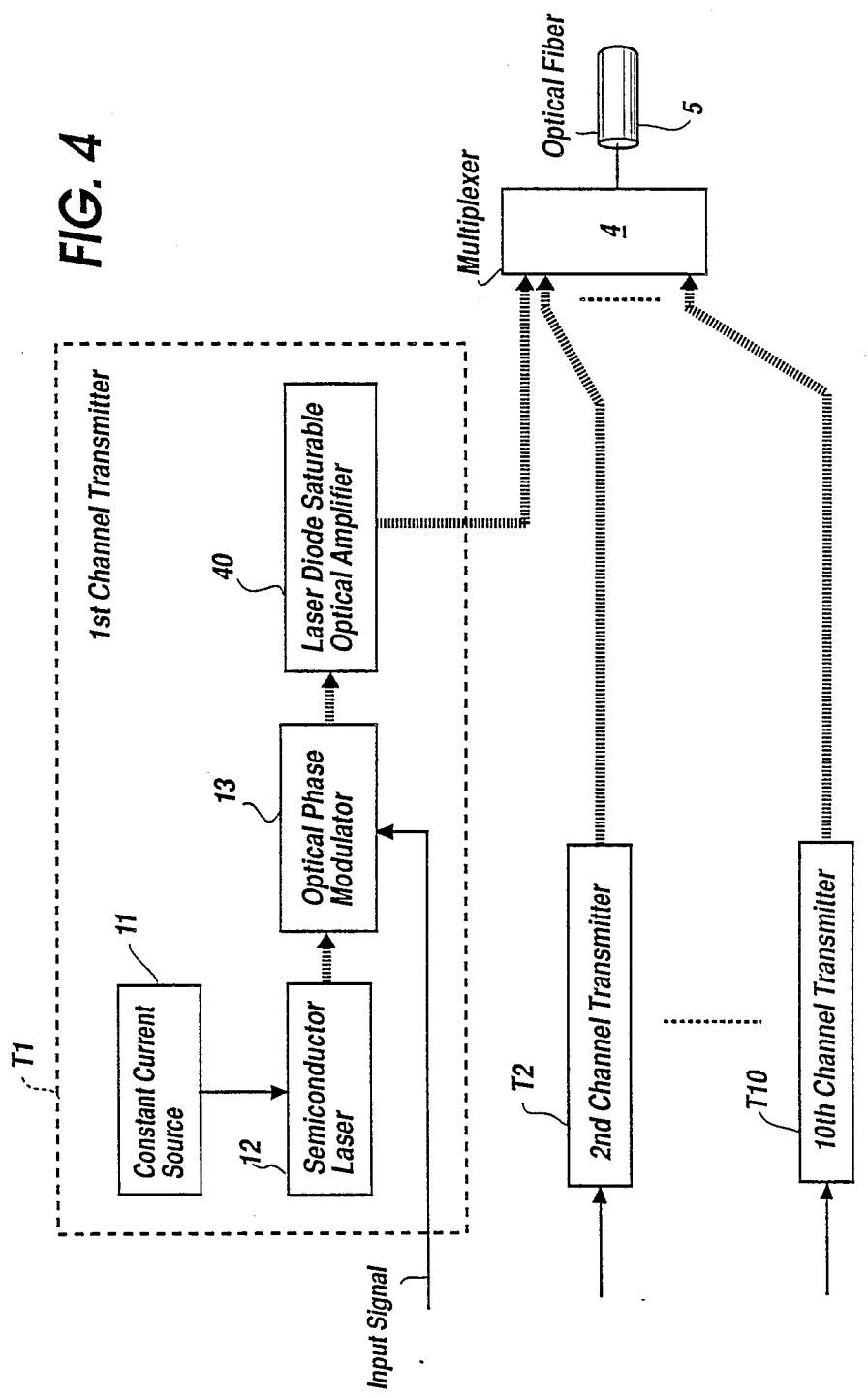
FIG. 4 is a block diagram of an alternative embodiment of the invention.
Figure 5:
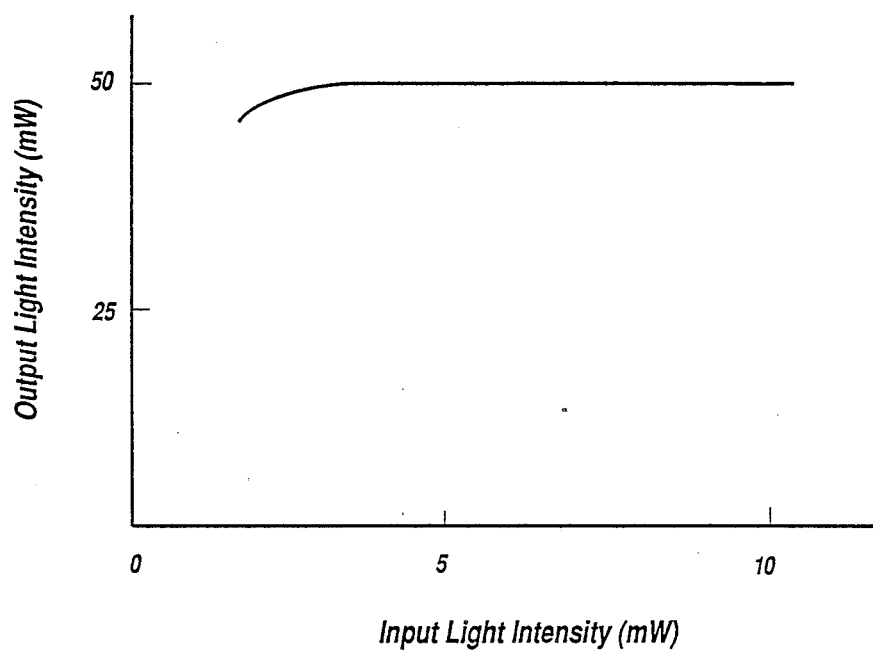
FIG. 5 is a graphic illustration of the operating characteristic of the saturable optical amplifier of FIG. 4.

The light intensity limiter 14 can also be implemented by a laser diode saturable light amplifier 40 as shown in FIG. 4. A conventional semiconductor laser diode is employed for the light amplifier 40. To ensure satisfactory high-frequency operating characteristic, both facets of the laser diode are coated with nonreflective material so that it operates as a travelling wave laser. Generally, a laser light amplifier generates an induced emission when operated in the negative temperature region of the carrier distribution so that it delivers an output light $I_{out} = I_{in} + I_{i.e}$, where $I_{in}$ and $I_{i.e}$ are the input light and induced emissions, respectively. If the input light is at low intensity, the induced component $I_{i.e.}$ varies in proportion to the input light $I_{in}$ and so the amplifier 40 acts as a linear amplifier. However, since the amount of excited electrons that contributes to the induced emission is finite, the component $I_{i.e.}$ has a predetermined maximum value. As a result, with an increase in the input light intensity the induced emission reaches a constant value as indicated in FIG. 5. In a practical aspect, the amplifier 40 has such a high gain that the input light is much lower in intensity than the induced component to ensure a satisfactory saturation characteristic. A double channel planar buried heterojunction (DC-PBH) laser diode with antireflection coatings and a 500-$\mu$m long active layer can also be used in the present invention For input optical power in the range between 5 and 10 mW, amplifier 40 can deliver a constant 50 mW output. The light intensity variation resulting from the phase modulation can be eliminated in this way without introducing loss in the output of the phase modulator 13.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:
1. A wavelength multiplexed optical transmitter, comprising:
   a plurality of light sources for respectively generating light beams of different wavelengths;
   a plurality of optical modulators associated respectively with said light sources, each of said modulators modulating the light beam of the associated light source in phase or frequency with a digital signal so that an angle-modulated light beam of a particular wavelength is produced by the associated modulator, said angle-modulated light beam containing amplitude-variation components resulting from the phase or frequency modulation of said digital signal and from intensity variation of the light beam of the associated light source;
   a plurality of amplitude control means respectively associated with said optical modulators, each of said amplitude control means comprising a beam splitter for splitting the modulated light beam from the associated optical modulator into a first component for coupling to said transmission medium and a second component, and means for detecting a difference between the intensity of said second component and a reference value and for controlling the associated amplitude control means in accordance with said difference to eliminate said amplitude-variation components, whereby a constant amplitude, angle-modulated component is extracted from the output of each of said optical modulators; and
   a multiplexer for multiplexing said constant-amplitude, angle-modulated components extracted by said plural amplitude control means into a wavelength multiplexed optical output beam for coupling to an optical transmission medium.

* * * * *